United States Patent
Ruan et al.

(10) Patent No.: US 7,820,973 B2
(45) Date of Patent: Oct. 26, 2010

(54) METHOD OF IDENTIFYING THE ENERGY RANGE OF RADIATION FROM RADIOACTIVE MATERIAL AND SYSTEM FOR DETECTING THE SAME

(75) Inventors: Ming Ruan, Beijing (CN); Jianhua Li, Beijing (CN); Jiaqing Zhu, Beijing (CN); Kun Zhao, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 11/964,102

(22) Filed: Dec. 26, 2007

(65) Prior Publication Data

US 2008/0191128 A1    Aug. 14, 2008

(51) Int. Cl.
*G01F 23/00* (2006.01)
(52) U.S. Cl. .................................. 250/361 R
(58) Field of Classification Search .............. 250/361 R
See application file for complete search history.

(56) References Cited

U.S. PATENT DOCUMENTS

| | | | | |
|---|---|---|---|---|
| 3,638,000 A | * | 1/1972 | Franco et al. | 250/362 |
| 3,869,608 A | * | 3/1975 | Scherbatskoy | 376/160 |
| 4,296,320 A | * | 10/1981 | Miller | 250/252.1 |
| 5,686,674 A | * | 11/1997 | Lowry et al. | 73/865.8 |
| 2002/0168016 A1 | * | 11/2002 | Wang et al. | 375/260 |

FOREIGN PATENT DOCUMENTS

DE    197 11 124    11/1997

* cited by examiner

*Primary Examiner*—David P Porta
*Assistant Examiner*—Kiho Kim
(74) *Attorney, Agent, or Firm*—Marshall, Gerstein & Borun LLP

(57) ABSTRACT

A method of identifying the energy range of radiation includes a system having a detector with energy differentiation characteristics, an electronic amplifier of a dual energy window, a data acquisition card, a digital threshold controller, a database, and a radiation energy range display. The system calculates the energy range of radiation through logical comparison, condition correction and mathematical fitting.

7 Claims, 4 Drawing Sheets

US 7,820,973 B2

METHOD OF IDENTIFYING THE ENERGY RANGE OF RADIATION FROM RADIOACTIVE MATERIAL AND SYSTEM FOR DETECTING THE SAME

CROSS-REFERENCE TO RELATED APPLICATIONS

This application claims the benefit of Chinese patent application No. 200610171612.2, filed Dec. 31, 2006.

BACKGROUND OF THE INVENTION

The invention relates to the field of developing and manufacturing a counting-type radiation detection instrument, in particular to a method of identifying the energy range of radiation from radioactive material and a system for detecting the same in a counting-type radiation detection system.

The counting-type radiation detection system is one of the commonly used devices for detecting the intensity, dose rate, etc. of radiation from radioactive material. In fields like special nuclear material detection, radioactive material detection, environmental dose rate detection, the counting-type radiation detection system has such characteristics as high detection speed, high sensitivity, wide energy spectrum response, etc., so it becomes a commonly used technique in these fields.

A conventional counting-type radiation detection system does not have the radiation energy identification function, so it is not very sensitive to the dose rate and energy of radiation.

A method of measuring natural background reflection as disclosed in German patent for invention DE 197 11 124 C2 can accurately and rapidly distinguish naturally occurring radiation material (NORM) from artificial radiation material, and the principle thereof is similar to that of a dual energy window method. However, said patent simply distinguishes NORM from artificial radiation material without showing the probability of the differentiation, and it cannot change the energy window threshold settings pertinently.

There is no report in China on the use of the dual energy window technique in such a counting-type instrument to identify the energy range of a radiation source.

SUMMARY OF THE INVENTION

An object of the invention is to provide a method of identifying the energy range of radiation from radioactive material and a system for detecting the same. In a counting-type radiation detection system according to the present invention, a dual energy window is arranged on an electronic amplifier, whose threshold is automatically set with respect to the energy range of interest by a controller. By measuring the dose rate and count rate of radioactive material, and calling the aforehand calibrating coefficient and physical algorithm, the energy range of radiation from the detected radioactive material can be identified.

One aspect of the present invention is to provide a method of identifying the energy range of radiation from radioactive material, which comprises the steps of:

S1: setting an electronic amplifier of digital dual energy window;

S2: regulating the threshold of the energy window with respect to the energy range of interest;

S3: calibrating the dual energy window system with standard calibration sources and saving the coefficient;

S4: detecting the dose rate and intensity of the radiation source of an unknown energy range;

S5: performing logical comparison, condition correction and mathematical fitting with the data acquired in step S4 and the saved coefficient; and S6: displaying the energy range of the detected radiation source.

Preferably, a controller for automatically regulating the energy window threshold is used in step S2 to regulate the threshold of the energy window; and the controller for automatically regulating the energy window threshold comprises circuits for digital threshold controlling, calculating and stabilizing.

Preferably, the electronic amplifier of digital dual energy window comprises a linear amplifier for the radiation signals and a threshold setting circuit for the digital dual energy window.

Another aspect of the invention is to provide a system for detecting the energy range of radiation, which comprises a detector with energy differentiation characteristics, an electronic amplifier, a data acquisition card, a digital threshold controller, a controlling, measuring, and calculating database, and a radiation energy range display, wherein the electronic amplifier is an electronic amplifier of digital dual energy window including a digital linear amplifier for the radiation signals and a threshold setting circuit for the digital dual energy window.

Preferably, the detector with energy differentiation characteristics is a large-area plastic scintillator.

The invention has the function of radiation energy identification that the conventional counting-type radiation detection system does not have. It ensures the high sensitivity of the system to radiation and enables the system to identify the energy range of the detected radiation. Meanwhile, it has a simple design, good compatibility, and a wide range of usage. It does not need to be equipped with a complex apparatus, so it has a low operation cost and can be conveniently used in the counting-type radiation detection system for various purposes.

DETAILED DESCRIPTION OF THE PREFERRED EMBODIMENTS

The following embodiments are intended to illustrate the invention but not to limit the scope of the invention.

The technical solution of a preferred embodiment of the invention is implemented in the following way: setting a dual energy window on an electronic amplifier of a counting-type radiation detection system; regulating the threshold of the energy window with respect to the energy range of the source of interest by a controller for automatically regulating the energy window threshold; calibrating the dual energy window system with a standard radiation source and the obtained calibrating coefficient being indicative of the energy range characteristics of the standard source; when the system is measuring the environmental background, dose rate and radiation source, the dual energy window system obtaining a set of data similar to the calibrating coefficient, such as counting rate and counting ratio of the dual window radiation; and calculating the radiation energy range of radioactive material detected by the system through algorithms like logical comparison, condition correction and mathematical fitting.

Generally, the output signals of a radiation detector carry the energy characteristics of the radiation, and after being amplified and output by a linear amplifier, the amplitude of the signal is proportional to the radiation energy. During conversion of the analog quantity into digital quantity, a conventional counting-type radiation detection system converts and counts signals that are higher than a certain threshold, while neglecting the energy information of the signals. In the dual energy window system, a plurality of thresholds are set after the amplifier, and radiation of different energy ranges are counted respectively to make different energy windows have information of different radiation energy, then after appropriate calibrating and mathematical processing, the system will have the function of identifying the radiation energy range.

The invention is further described below with reference to the figures.

Figure 1:
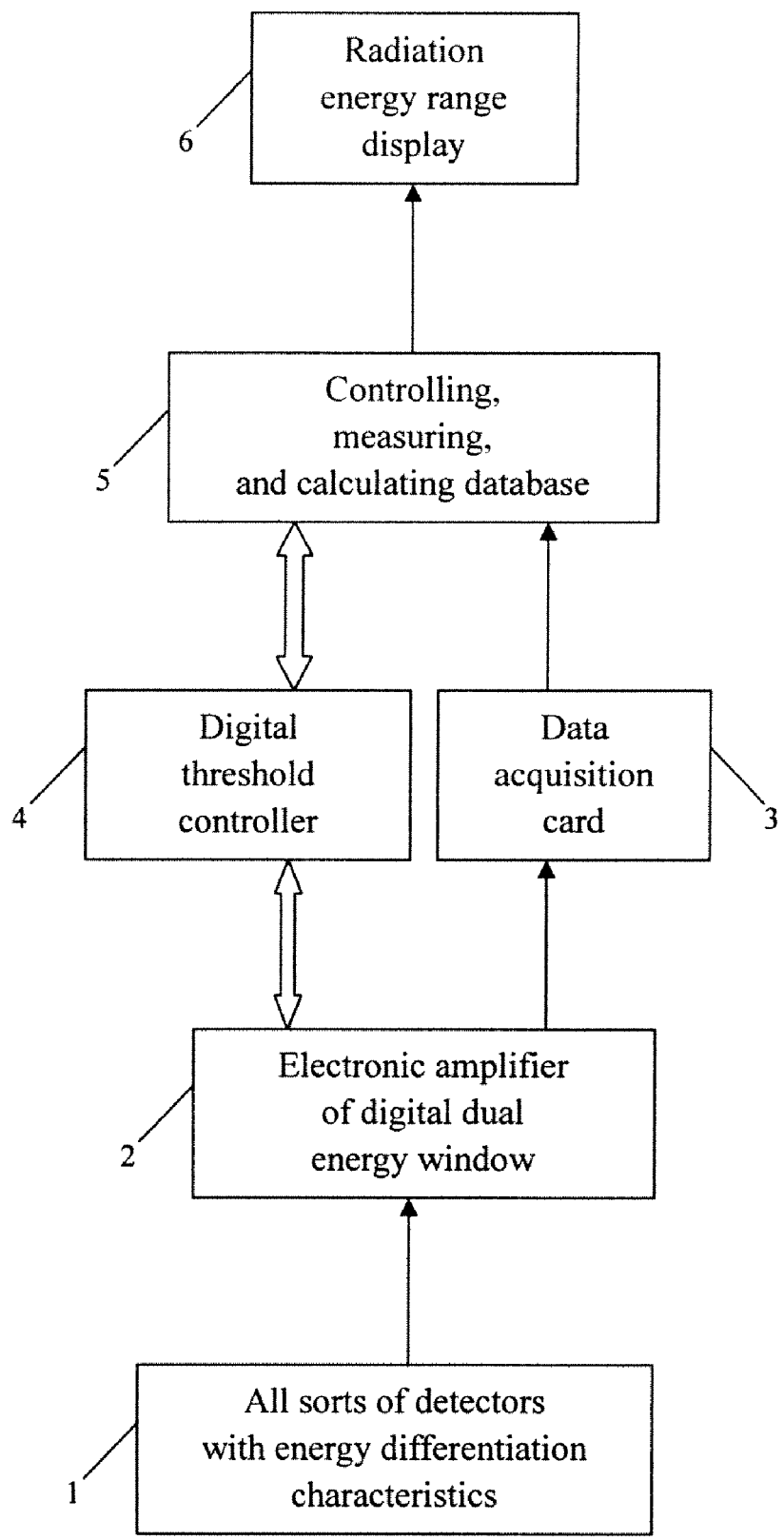
FIG. 1 is a schematic drawing of the structure of a counting-type radiation energy range detection system according to a preferred embodiment of the present invention.
Figure 2:
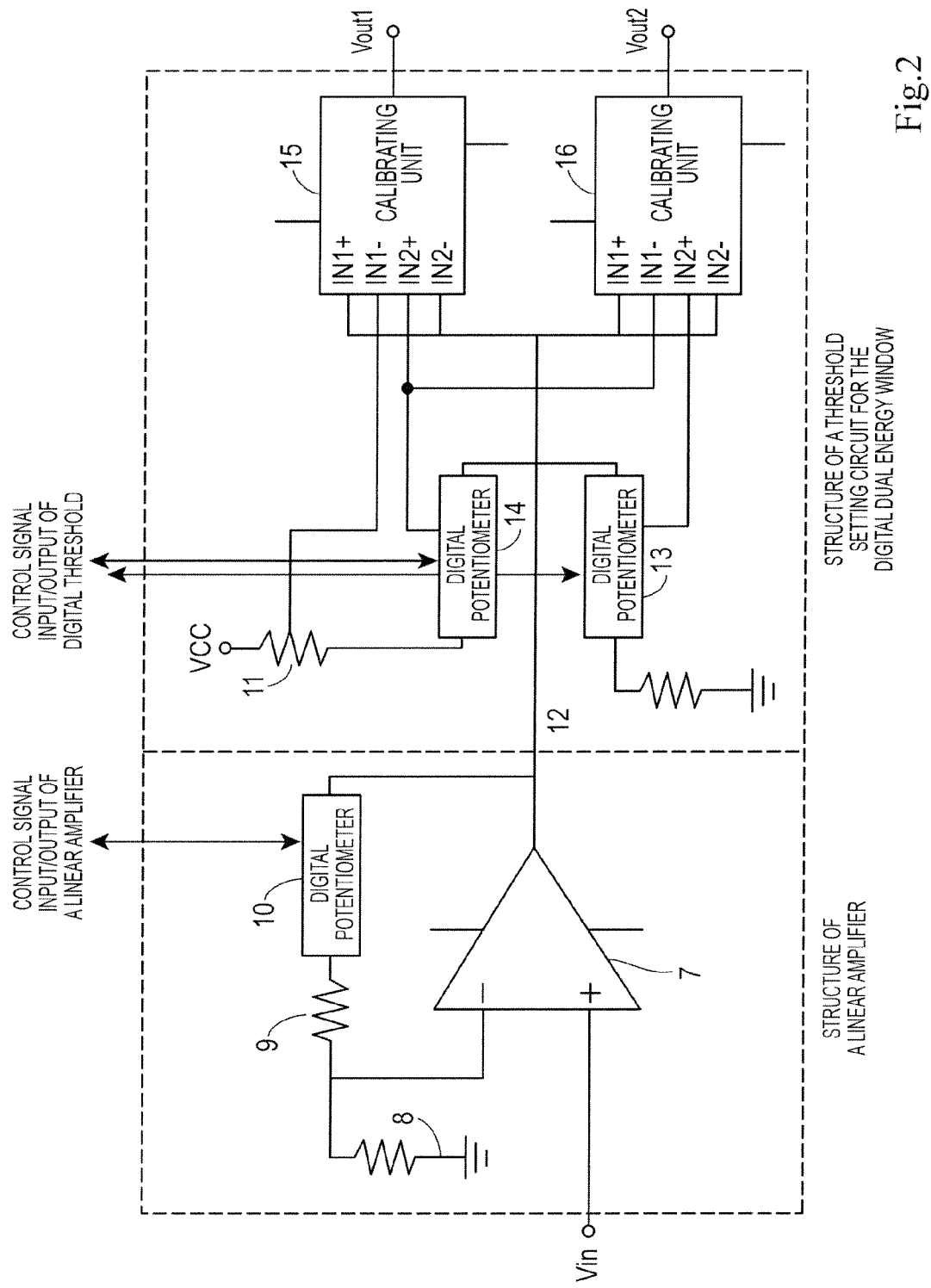
FIG. 2 is a schematic drawing of the structure of the electronic amplifier of digital dual energy window in the counting-type radiation energy range detection system according to the above-mentioned embodiment of the present invention.

In the embodiment, the structure of the counting-type radiation energy range detection system is as shown in FIG. 1. Said system comprises a detector 1 with energy differentiation characteristics, an electronic amplifier of digital dual energy window 2, a data acquisition card 3, a digital threshold controller 4, a controlling, measuring, and calculating database 5, and a radiation energy range display 6. The circuit structure of the electronic amplifier of digital dual energy window 2 is as shown in FIG. 2, which comprises an input terminal Vin, two output terminals Vout1 and Vout2, an operation amplifier 7, resistors 8, 9, 11, 12, digital potentiometers 10, 13, 14, calibrating units 15, 16, and a circuit for digital threshold controlling, calculating and stabilizing.

In a preferred embodiment, a large-area plastic scintillator is used as the detector with energy differentiation characteristics.

Figure 3:
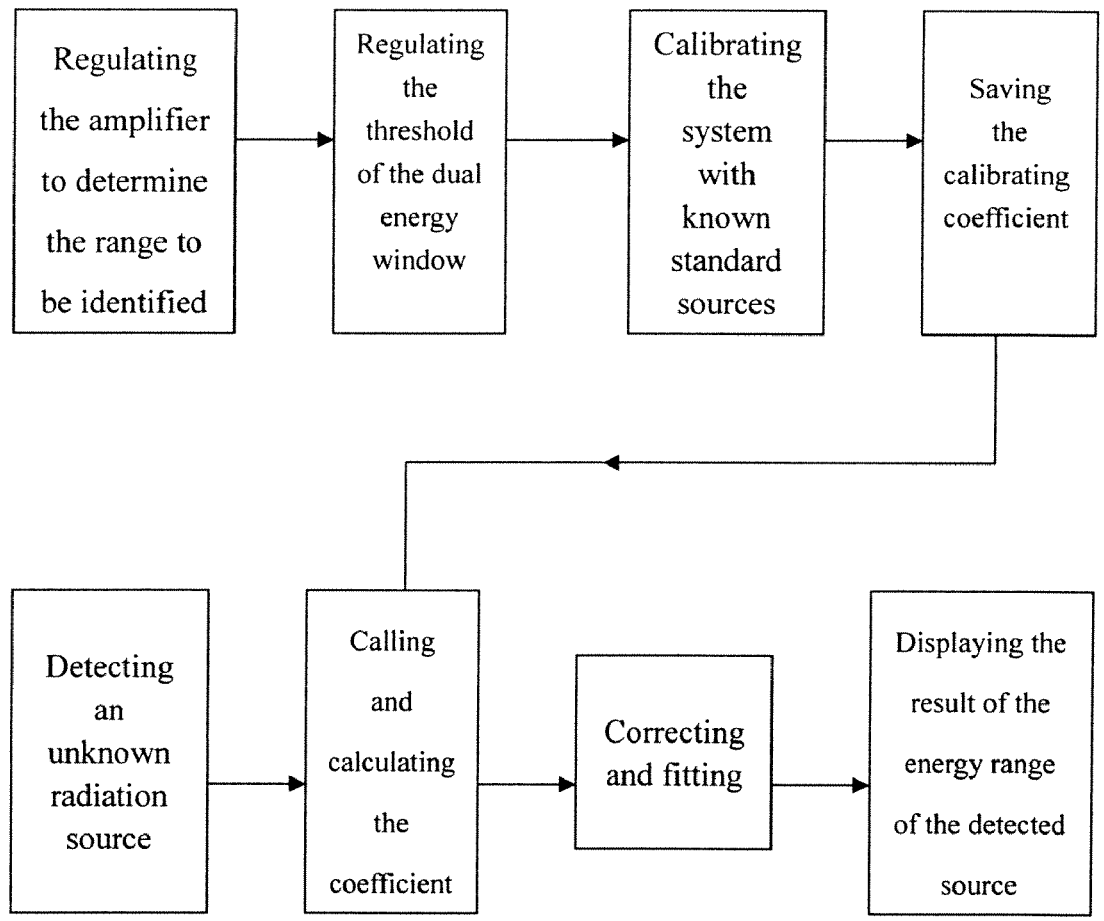
FIG. 3 is a schematic drawing of the logical relationship according to a preferred embodiment of the present invention.

FIG. 3 is a schematic drawing of the logical relationship according to a preferred embodiment of the present invention. As shown in the figure, first regulating an amplifier with a dual energy window provided thereto to determine the range to be identified; then regulating the threshold of the dual energy window, calibrating the system with standard radiation sources and saving the calibrating coefficient; upon detection of any unknown radiation source, calling the standard calibrating coefficient to perform processing like logical comparison and condition correction on the data of the measured unknown radiation source, then calculating the energy range of the unknown radiation source.

In the invention, a software energy range identification algorithm is used to perform the acquisition of calibrating coefficient, comparison and correction of the coefficient, and mathematical fitting, which includes a method of calibrating the standard radiation source energy range, a method of system calling, comparing and correcting, physical logic computation, and a method of calculating the source energy range display probability.

The mathematical logic therein is described as follows: the environmental background dual window counting rate and ratio, standard source dual window net counting ratio of the known energy ranges, $n_{1b}$, $n_{2b}$, $P_{BKG}$, $P_i$.

Wherein $n_{1b}$ and $n_{2b}$ represent different window background counting rates; $P_{BKG}$ is the passive background counting ratio, and $P_i$ represents the net counting ratio of the standard source of different energy ranges, i=1, 2, 3, . . . , n.

Measuring the counting rate of the radiation source of unknown energy range in the system dual window: n1, n2 (1 and 2 represent different windows);

obtaining the net counting ratio of said radiation source of unknown energy range in the system dual window:

Px=(n1−$n_{1b}$)/(n2−$n_{2b}$), Px represents the net counting ratio of the source of unknown energy range;

determining the energy interval in which the radiation source of unknown energy range is located:

when Py<=Px<=Pz, $$y=(Pz-Px)/(Pz-Py)\times R; z=R-y.$$

Outputting the radiation source energy range of the unknown energy range: y energy range, confidence: y %;

z energy range, confidence: z %;

wherein Py and Pz represent the net counting ratio of the standard source in the known energy range; y % and z % represent the probability of the unknown radiation source in the known energy ranges y and z; and R is a system correction quantity.

For example, in devices for checking and monitoring radioactive material, a large-area plastic scintillator is often used in combination with the counting-type electronics technique to form a radiation monitoring system with high sensitivity for radioactive material. However, such kind of system cannot distinguish the energy range of the detected source, while the generally used radiation energy spectrum instrument is expensive and cannot meet the demand of rapid checking and monitoring as far as its sensitivity is concerned. If a counting-type radiation monitoring system of a dual energy window technique is used, the threshold of the window can be set according to the radiation energy of the range of interest, such as radioactive element of 40K in crude potash fertilizer. When there is a large amount of potash fertilizer, it brings great interference to the counting-type radiation monitoring system. If a certain energy window of the dual energy window system is set to the energy range of 40K, the radioactive material of an energy range of 40K and the nearby energy ranges can be effectively identified, thus improving the sensitivity and accuracy of the system.

Figure 4:
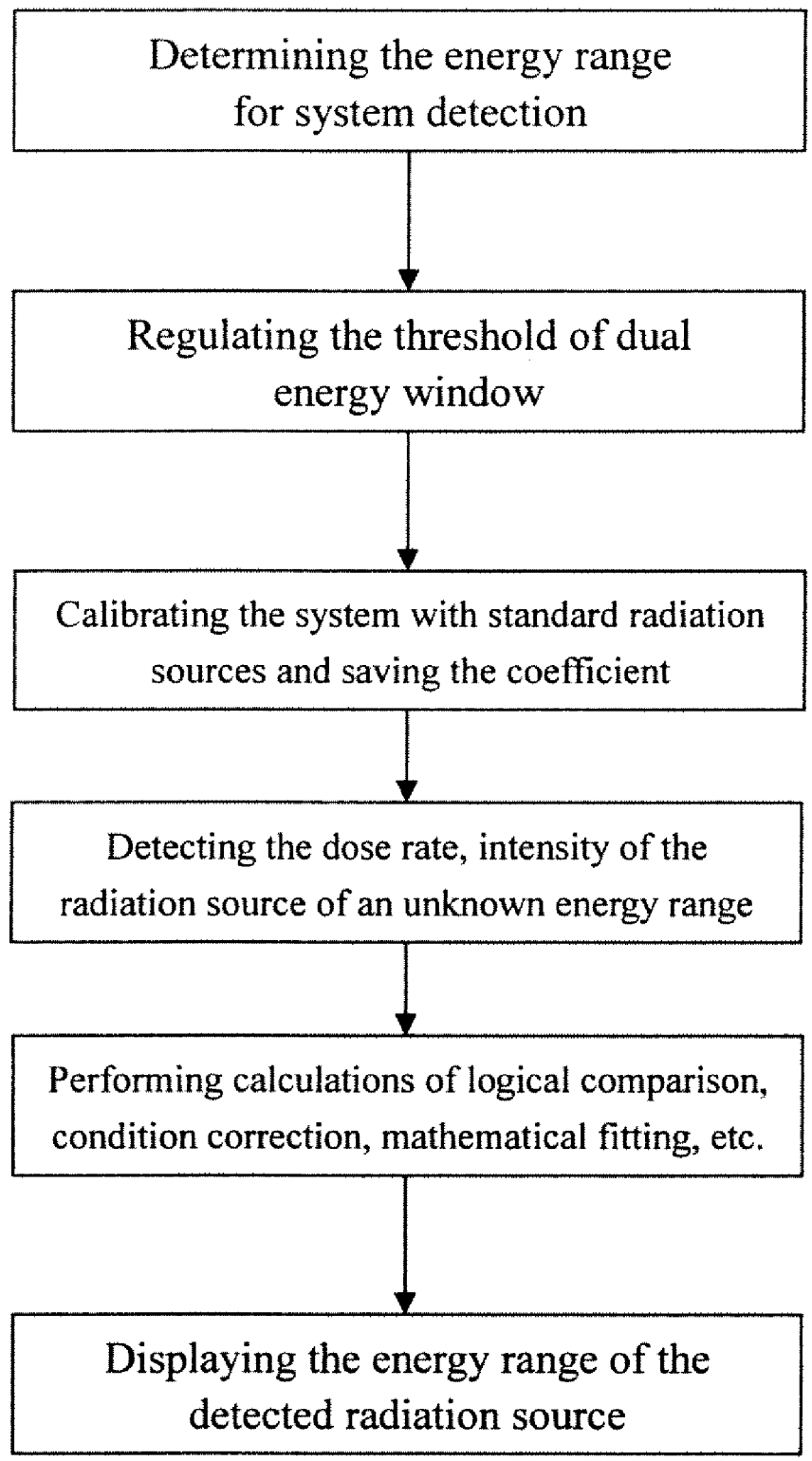
FIG. 4 is the operation flow according to a preferred embodiment of the present invention.

In a preferred embodiment according to the present invention, a complete system operation flow is as shown in FIG. 4. 1: determining the energy range for system detection; 2: regulating the threshold of dual energy window; 3: calibrating the system with standard radiation sources and saving the coefficient; 4: detecting the dose rate, intensity, etc. of the radiation source of an unknown energy range; 5: performing calculations of logical comparison, condition correction, mathematical fitting, etc.; 6: displaying the energy range of the detected radiation source.

The invention can distinguish an artificial radiation source (low energy, counting of the first window) from a natural background by providing a dual energy window in a detection system; and it solves the problem that the detection sensitivity falls owing to the masking effect of vehicles, i.e. the core of the previously mentioned German patent (a single window cannot overcome the vehicle masking effect). Furthermore, it can separately count the source energy range that is of special interest to improve the detection sensitivity of said energy range. In addition, within an acceptable error report rate and accuracy rate, a threshold is set for a probability of an alarm source of interest, i.e. distinguishing the true and false alarm. Owing to the existence of dual window, the whole counting level is the same as the single window (within the same counting threshold range), so it will not compromise the sensitivity of alarm for other dangerous radioactive isotopes, while for some sources of danger that require special attention, the sensitivity thereof can be increased higher.

Although the invention is shown and illustrated with reference to the specific embodiments, those persons familiar with this technical field can understand that various changes can be made both in form and in detail without departing from the spirit essence and patent protection scope of the invention.

Therefore, according to the above described technical solutions, all the solutions in which the counting-type radiation (X-ray, neutrons, charged particles) detection system uses a dual energy window to identify the energy range of radiation source fall into the protection scope of the present invention.

Moreover, according to the above described technical solutions, all the solutions in which the counting-type radiation (X-ray, neutrons, charged particles) detection system uses a finite number (2-10) of multiple energy windows to identify the energy range of radiation source fall into the protection scope of the present invention.

LIST OF REFERENCE SIGNS 1 detector with energy differentiation characteristics
2 electronic amplifier of digital dual energy window
3 data acquisition card
4 digital threshold controller
5 controlling, measuring, and calculating database
6 radiation energy range display
7 operation amplifier
8 resistor
9 resistor
10 digital potentiometer
11 resistor
12 resistor
13 digital potentiometer
14 digital potentiometer
15 calibrating unit
16 calibrating unit

The invention claimed is:

1. A method of identifying an energy range of radiation from a radioactive source of interest wherein the method comprises the steps of:
   S1: setting an electronic amplifier having a digital dual energy window;
   S2: regulating a threshold of the digital dual energy window with respect to the energy range of the source of interest;
   S3: calibrating the digital dual energy window with standard radiation sources and saving a calibration coefficient;
   S4: acquiring data by detecting a dose rate and an intensity of the source of interest having an unknown energy range;
   S5: performing a logical comparison of the acquired data from step S4 against the saved calibration coefficient; and
   S6: displaying the energy range of the radioactive source of interest.

2. The method of claim 1, wherein a controller for automatically regulating the digital dual energy window threshold is used in step S2.

3. The method of claim 2, wherein the controller for automatically regulating the digital dual energy window threshold comprises circuits for digital threshold controlling, calculating and stabilizing.

4. The method of claim 1, wherein the electronic amplifier of digital dual energy window comprises a digital linear amplifier for radiation signals and a threshold setting circuit for the digital dual energy window.

5. The method of claim 4, wherein the digital linear amplifier comprises an input terminal (Vin), an operation amplifier, one or more resistors, and a digital potentiometer; and the threshold setting circuit for the digital dual energy window comprises a standard voltage (VCC), one or more resistors, one or more digital potentiometers, one or more calibrating units, and two output terminals (Vout1, Vout2).

6. The method of claim 1, wherein step S3 comprises regulating the gain and threshold of the electronic amplifier first, then calibrating the digital dual energy window with standard sources of the energy range of interest, and recording the calibration coefficient of the source corresponding to the digital dual window.

7. The method of claim 1, wherein step S5 comprises coefficient calling, comparing and correcting, logical computation, and source energy range probability computation.

* * * * *